United States Patent
Haddad

(10) Patent No.: US 8,385,285 B2
(45) Date of Patent: Feb. 26, 2013

(54) SYSTEM, METHOD AND DEVICES FOR ENABLING EFFICIENT HYBRID ROUTE OPTIMIZATION BETWEEN TWO MOBILE ENDPOINTS

(75) Inventor: Wassim Haddad, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 425 days.

(21) Appl. No.: 12/828,811

(22) Filed: Jul. 1, 2010

(65) Prior Publication Data
US 2011/0122832 A1    May 26, 2011

Related U.S. Application Data

(60) Provisional application No. 61/263,333, filed on Nov. 20, 2009.

(51) Int. Cl.
*H04W 4/00* (2009.01)
(52) U.S. Cl. ........................... 370/329; 370/328
(58) Field of Classification Search ........................ None
See application file for complete search history.

(56) References Cited

U.S. PATENT DOCUMENTS

| | | | |
|---|---|---|---|
| 2004/0184444 A1* | 9/2004 | Aimoto et al. | 370/352 |
| 2005/0265276 A1 | 12/2005 | Takeda et al. | |
| 2007/0135132 A1* | 6/2007 | Ishii et al. | 455/453 |
| 2011/0032836 A1* | 2/2011 | Maruhashi | 370/252 |

FOREIGN PATENT DOCUMENTS

| | | |
|---|---|---|
| EP | 1 986 392 A1 | 10/2008 |
| WO | WO 2006/064960 A1 | 6/2006 |

OTHER PUBLICATIONS

Johnson. D. et al. Mobility Support for IPv6.IETF, RFC 3775, Oct. 2009.
Gundavelli. S. et al. Proxy Mobile IPv6.IETF, RFC 5213, Aug. 2008.
Suigimoto, S. et al. Experimental Evaluations of Feasibility and Bottlenecks of $IP^2$ Mobility Management. IEEE 2005.
Sangjin, Jeong, et al. Implementation of Route Optimization Mechanism Supporting IPv4/IPv6 Traversal in Proxy Mobile IPv6. Advanced Communication Technology 2009. ICACT 2009. $11^{th}$ International Conference. Piscataway, NJ, USA. Feb. 15, 2009.

* cited by examiner

Primary Examiner — David Oveissi

(57) ABSTRACT

A network, a method and devices (i.e., mobile node, access router, home agent, destination home agent) are described herein for enabling an efficient hybrid route optimization between two mobile endpoints so they can re-direct their data traffic to an optimal path without exchanging any mobility signaling messages.

16 Claims, 6 Drawing Sheets

SYSTEM, METHOD AND DEVICES FOR ENABLING EFFICIENT HYBRID ROUTE OPTIMIZATION BETWEEN TWO MOBILE ENDPOINTS

CLAIMING BENEFIT OF PRIOR FILED U.S. APPLICATION

This patent application claims the benefit of U.S. Application Ser. No. 61/263,333 filed on Nov. 20, 2009 the contents of which are hereby incorporated by reference herein.

TECHNICAL FIELD

The present invention relates in general to the wireless telecommunications field and, in particular, to a network, a method and devices (i.e., mobile node, access router, home agent, destination home agent) for enabling an efficient hybrid route optimization between two mobile endpoints so they can re-direct their data traffic to an optimal path without exchanging any mobility signaling messages.

BACKGROUND

The following abbreviations are herewith defined, at least some of which are referred to within the following description of the prior art and the present invention.
AR Access Router
BA Binding Acknowledgement
BCE Binding Cache Entry
BU Binding Update
CoA Care-of Address
CN Correspondent Node
D-HA Destination Home Agent
HA Home Agent
HD High Definition
HoA Home Address
IETF Internet Engineering Task Force
IP Internet Protocol
LTE Long Term Evolution
MAG Mobility Access Gateway
MN Mobile Node
NoA Notification Acknowledgment
NoU Notification Update
PBU Proxy Binding Update
PNA Presence Notification Acknowledgment
PNU Presence Notification Update
RNA Register Notification Acknowledgment
RNR Register Notification Request
RO Route Optimization
SQN Sequence Number The Internet Engineering Task Force (IETF) has recently been focused on what is known in the wireless communications field as the hybrid route optimization (RO) mode which allows both a mobile node and the network infrastructure to take different responsibilities to provide an optimal IP handoff. The hybrid RO mode is a mixture of host-based mobility and network-based mobility which is desired and perhaps required to enable operators to closely assist the mobile node in selecting the right path for exchanging data packets with a correspondent node (i.e. a peer for the mobile node). The mixture of host-based mobility and network-based mobility is also desired to enable operators to control and optimize their available bandwidth, optimize the mobile device's power consumption while providing a high quality of service. However, there a no existing solution associated with hybrid RO mode that takes into consideration the scenario of two mobile nodes talking to each other. This "dual mobility endpoints" scenario in which two mobile nodes talk to each other is going to have tremendous and continuous growth due to the popularity of smart phones (e.g., IPhones) which can be coupled together with high speed wireless channels that are expected to be provided by LIE. Consequently, the likelihood of establishing HD multimedia sessions between two mobile nodes will only increase in the future. Accordingly, there is a need to improve the hybrid RO mode to address the dual mobility endpoint scenario. This need and other needs have been addressed by the present invention.

SUMMARY

A method, a network, an access router, a home agent, and a destination home agent are described in the independent claims of the present application. Advantageous embodiments of the method, the network, the access router, the home agent, and the destination home agent are described in the dependent claims.

In one aspect, the present invention provides a method for enabling a hybrid route optimization in a network between two mobile endpoints including a MN and a CN, wherein the MN is associated with a HA and the CN is associated with a D-HA, and wherein the MN is able to move around and attach to anyone of a plurality of ARs. The method includes at least five steps where the first step includes sending a first message from the MN to the HA, wherein the first message includes an Internet Protocol address of the CN, and wherein the HA uses the Internet Protocol address to identify the D-HA. The second step includes sending a second message from the HA to at least one of the ARs, wherein the second message includes information about the MN, the CN, and the D-HA. The third step includes sending a third message from the at least one of the ARs to the D-HA, wherein the third message subscribes the at least one of the ARs at the D-HA for a presence notification service in which the D-HA is to update the at least one of the ARs about a care-of address of the CN whenever the CN sends the care-of address to the D-HA. The fourth step includes sending a fourth message from the D-HA to the at least one of the ARs, wherein the fourth message identifies the care-of address of the CN. The fifth step includes one of the at least one of the ARs that is attached to the MN upon receiving the fourth message sending a fifth message to the MN, wherein the fifth message includes the care-of address of the CN which enables a re-direction of data traffic between the MN and the CN. The method has an advantage in that it enables an efficient hybrid route optimization between two mobile endpoints namely the MN and CN so they can re-direct their data traffic to an optimal path without exchanging any mobility signaling messages.

In yet another aspect, the present invention provides a network for enabling a hybrid route optimization between two mobile endpoints including a MN and a CN, wherein the MN is associated with a HA and the CN is associated with a D-HA, and wherein the MN is able to move around and attach to anyone of a plurality of ARs. The MN sends a first message to the HA, wherein the first message includes an Internet Protocol address of the CN, and wherein the HA uses the Internet Protocol address to identify the D-HA. The HA sends a second message to at least one of the ARs, wherein the second message includes information about the MN, the CN, and the D-HA. The at least one of the ARs sends a third message to the D-HA, wherein the third message subscribes the at least one of the ARs at the D-HA for a presence notification service in which the D-HA is to update the at least one of the ARs about a care-of address of the CN whenever the CN sends the care-of address to the D-HA. The D-HA sends a fourth message to the at least one of the ARs, wherein the fourth message identifies the care-of address of the CN. The AR that receives the fourth message and is attached to the MN sends a fifth message to the MN, wherein the fifth message includes the care-of address of the CN which enables a re-direction of data traffic between the MN and the CN. The network has an advantage in that it enables an efficient hybrid route optimization between two mobile endpoints namely the MN and CN so they can re-direct their data traffic to an optimal path without exchanging any mobility signaling messages.

In still yet another aspect, the present invention provides an AR for enabling a hybrid route optimization between two mobile endpoints including a MN and a CN, wherein the MN is attached to the AR and associated with a HA, wherein the CN is associated with a D-HA, wherein the MN sends a first message to the HA, wherein the first message includes an IPv6 address of the CN, and wherein the HA uses the IPv6 address to identify the D-HA. The AR comprises a processor and a memory that stores processor-executable instructions wherein the processor interfaces with the memory and executes the processor-executable instructions to perform at least four steps. The first step is to receive a second message from the HA; wherein the second message includes information about the MN, the CN, and the D-HA. The second step is to send a third message to the D-HA, wherein the third message subscribes the AR at the D-HA for a presence notification service in which the D-HA is to update the AR about a care-of address of the CN whenever the CN sends the care-of address to the D-HA. The third step is to receive a fourth message from the D-HA, wherein the fourth message identifies the care-of address of the CN. The fourth step is to send a fifth message to the MN, wherein the fifth message includes the care-of address of the CN which enables a re-direction of data traffic between the MN and the CN. The AR has an advantage in that it enables an efficient hybrid route optimization between two mobile endpoints namely the MN and CN so they can re-direct their data traffic to an optimal path without having to exchange any mobility signaling messages.

In still yet another aspect, the present invention provides a HA for enabling a hybrid route optimization between two mobile endpoints including a MN and a CN, wherein the MN is associated with the HA, wherein the CN is associated with a D-HA, wherein the MN is able to move around and attach to anyone of a plurality of ARs. The HA includes a processor and a memory that stores processor-executable instructions wherein the processor interfaces with the memory and executes the processor-executable instructions to perform at least three steps. The first step is to receive a first message from the MN, wherein the first message includes an IP address of the CN. The second step is to use the IP address to identify the D-HA. The third step is to send a second message to at least one of the ARs, wherein the second message includes information about the MN, the CN, and the D-HA, wherein the at least one of the ARs sends a third message to the D-HA, wherein the third message subscribes the at least one of the ARs at the D-HA for a presence notification service in which the D-HA is to update the at least one of the ARs about a care-of address of the CN whenever the CN sends the care-of address to the D-HA, wherein the D-HA sends a fourth message to the at least one of the ARs, wherein the fourth message identifies the care-of address of the CN, and wherein the one AR that receives the fourth message and is attached to the MN sends a fifth message to the MN, wherein the fifth message includes the care-of address of the CN which enables a re-direction of data traffic between the MN and the CN. The HA has an advantage in that it enables an efficient hybrid route optimization between two mobile endpoints namely the MN and CN so they can re-direct their data traffic to an optimal path without having to exchange any mobility signaling messages.

In yet another aspect, the present invention provides a D-HA for enabling a hybrid route optimization between two mobile endpoints including a MN and a CN. The MN is associated with a HA and the CN is associated with the D-HA. The MN is able to move around and attach to anyone of a plurality of ARs. The MN sends a first message to the HA, wherein the first message includes an IP address of the CN. The HA uses the IP address to identify the D-HA. The HA sends a second message to at least one of the ARs, wherein the second message includes information about the MN, the CN, and the D-HA. The D-HA includes a processor and a memory that stores processor-executable instructions wherein the processor interfaces with the memory and executes the processor-executable instructions to perform at least two steps. The first step is to receive a third message from the at least one of the ARs, wherein the third message subscribes the at least one of the ARs at the D-HA for a presence notification service in which the D-HA is to update the at least one of the ARs about a care-of address of the CN whenever the CN sends a care-of address of the CN to the D-HA. The second step is to send a fourth message to the at least one of the ARs, wherein the fourth message identifies the care-of address of the CN, wherein the AR that receives the fourth message and is attached to the MN sends a fifth message to the MN, and wherein the fifth message includes the care-of address of the CN which enables a re-direction of data traffic between the MN and the CN. The D-HA has an advantage in that it enables an efficient hybrid route optimization between two mobile endpoints namely the MN and CN so they can re-direct their data traffic to an optimal path without having to exchange any mobility signaling messages.

The present invention also provides a HA for enabling a hybrid route optimization between two mobile endpoints including a MN and a CN, wherein the MN is associated with the HA and the CN is associated with a D-HA, and wherein the MN is able to move around and attach to anyone of a plurality of ARs. The HA includes: (a) a processor; and (b) a memory that stores processor-executable instructions wherein the processor interfaces with the memory and executes the processor-executable instructions to: (i) receive a first message from the MN, wherein the first message includes an Internet Protocol address of the CN; (ii) use the Internet Protocol address to identify the D-HA; (iii) send a second message to the D-HA, wherein the second message subscribes the HA at the D-HA for a presence notification service in which the D-HA is to update the HA about a care-of address of the CN whenever the CN sends the care-of address to the D-HA; (iv) receive a third message from the D-HA, wherein the third message identifies the care-of address of the CN; and (v) send a fourth message to the MN, wherein the fourth message includes the care-of address of the CN which enables a re-direction of data traffic between the MN and the CN. The HA has an advantage in that it enables an efficient hybrid route optimization between two mobile endpoints namely the MN and CN so they can re-direct their data traffic to an optimal path without having to exchange any mobility signaling messages.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 5 is a block diagram of the exemplary network which is used to help explain in greater detail step 208 of the method 200 shown in FIG. 2 in accordance with an embodiment of the present invention.

DETAILED DESCRIPTION

Figure 1:
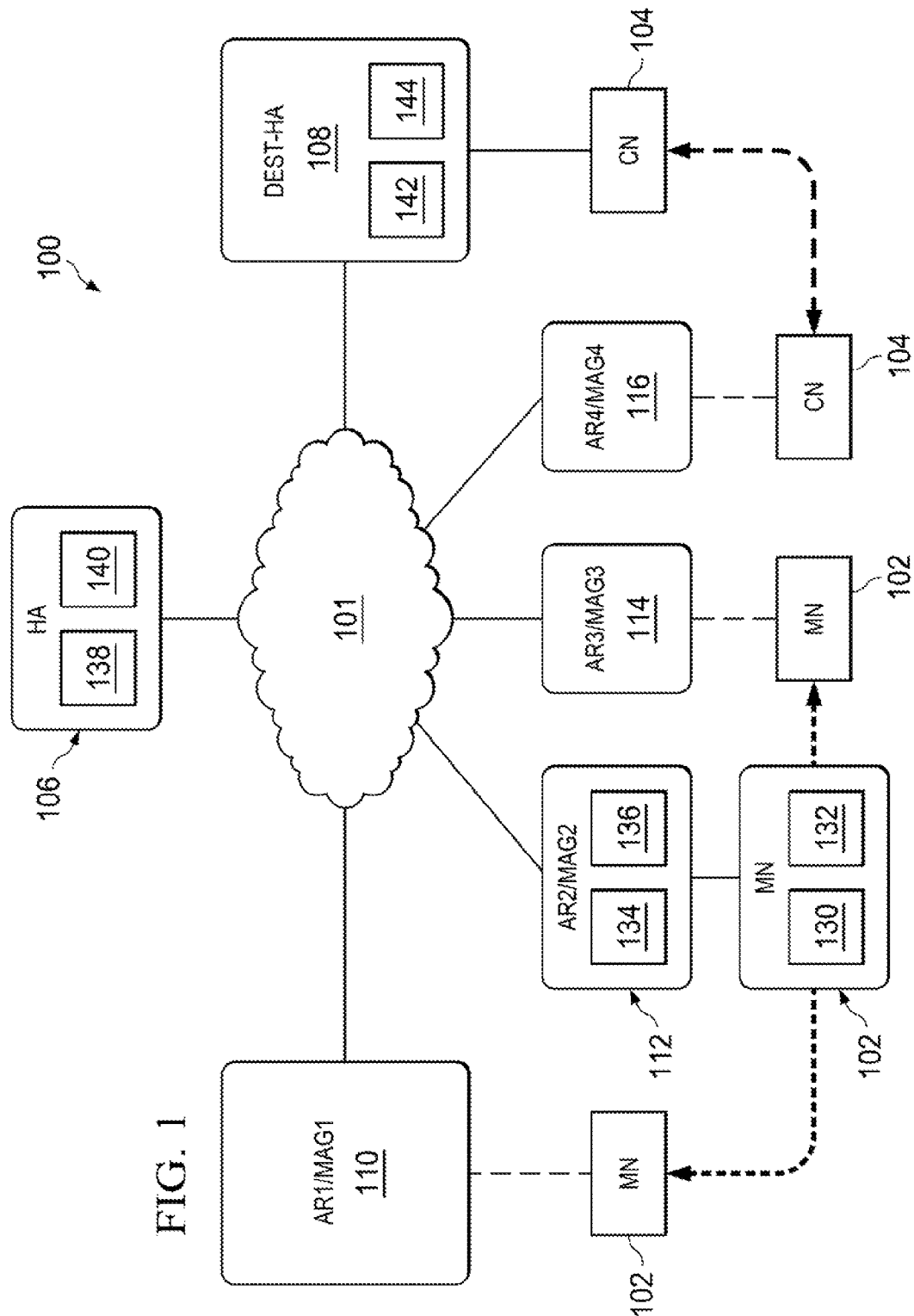
FIG. 1 is a block diagram of an exemplary network configured to enable an efficient hybrid RO mode between two mobile endpoints namely a MN and CN in accordance with an embodiment of the present invention.

Referring to FIG. 1, there is a block diagram of an exemplary network 100 configured to enable an efficient hybrid RO mode between two mobile endpoints in accordance with an embodiment of the present invention. The exemplary network 100 includes an interconnecting network 101 which couples a MN 102, a CN 104 (i.e. a peer for the MN 102), a HA 106 (associated with the MN 102), a D-HA 108 (associated with the CN 104), a first AR 110 (e.g., first MAG 110), a second AR 112 (e.g., second MAG 112), a third AR 114 (e.g., third MAG 114), and a fourth AR 116 (e.g., fourth MAG 116). The HA 106 can identify the D-HA 108 and communicate securely with the D-HA 108 and the ARs 110, 112, 114 which could be visited by the MN 102. The ARs 110, 112, 114, 116 can communicate with both the HA 106 and the D-HA 108. In this example, the MN 102 is shown as being currently attached to the second AR 112 but the MN 102 is mobile and can potentially move to and attach to either the first AR 110 or the third AR 114. The CN 104 is shown as being currently attached to the D-HA 108 but the CN 104 is mobile and can potentially move to and attach to the fourth AR 116. Alternatively, the CN 104 may move around the same set of ARs 110, 112, and 114 associated with the MN 102 or within another set of ARs 116 which do not intersect with the ARs 110, 112, and 114.

The exemplary network 100 includes many other components that are well known in the art but for clarity are not described herein while the components 102, 104, 106, 108, 110, 112, 114, 116 which are relevant to the present invention are described in detail herein. In particular, a detailed description about the functionality of the components 102, 104, 106, 108, 110, 112, 114 and 116 is provided next to explain how to enable the hybrid. HO mode for the two mobile endpoints including the MN 102 and the CN 104 so they can re-direct their data traffic to the optimal path without exchanging any mobility signaling messages.

Figure 2:
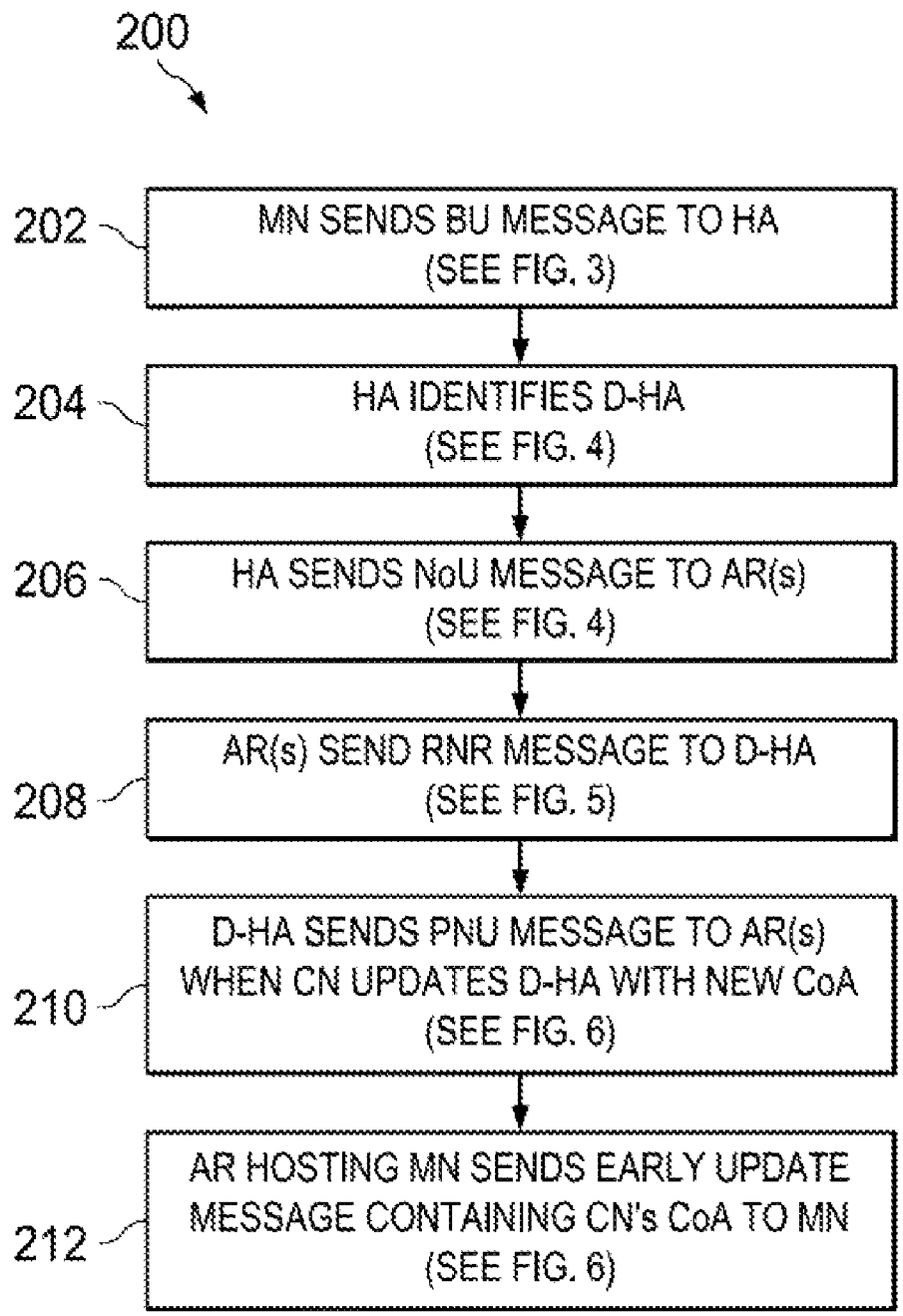
FIG. 2 is a flowchart illustrating the steps of an exemplary method for enabling an efficient hybrid route optimization between two mobile endpoints namely the MN and the CN in accordance with an embodiment of the present invention.

Referring to FIG. 2, there is a flowchart illustrating the steps of an exemplary method 200 for enabling an efficient hybrid route optimization between two mobile endpoints namely the MN 102 and the CN 104 in accordance with an embodiment of the present invention. The method 200 includes the following general steps which are described in greater detail below:

1. MN 102 sends a message (i.e.; BU message) to the HA 106 which notifies the HA 106 about the IPv6 address of the CN 104 (see step 202 and FIG. 3).

2. HA 106 identifies and possibly subscribes for a "presence" service with the D-HA 108 (see step 204 and FIG. 4).

3. HA 106 updates one or more of the potential ARs 110, 112, and 114 by sending them a message (i.e., NoU message) which includes information about the MN 102, the CN 104, and the D-HA 108 (see step 206 and FIG. 4).

4. Each potential AR 110, 112 and 114 sends a message (i.e., RNR message) to the D-HA 108 to subscribe for a presence service to receive updates about CN 104 (see step 208 and FIG. 5). In a simpler deployment, only the AR 112 which is currently attached to the MN 102 sends the message to the D-HA 108. In one application, the HA 106 could explicitly request that the ARs 110, 112 and 114 send the RNR message to the D-HA 108.

5. When the CN 104 updates the D-HA 108 with a new CoA, then the D-HA 108 sends a message (i.e., PNU message) to immediately update each AR 110, 112 and 114 and possibly the HA 106 which have previously subscribed for a presence service related to the CN 104 (see step 210 and FIG. 6).

6. The AR 110, 112 or 114 that is attached to and hosting the MN 102 immediately sends a message (i.e., early update message) to the MN 102 to update the MN 102 about the current location (CoA) of the CN 104 so that the hybrid RO mode can always be used (see step 212 and FIG. 6).

The exemplary method 200 ensures that the hybrid RO mode can be used between two mobile endpoints namely the MN 102 and CN 104 while minimizing/removing the exchange of signalling messages on the MN 102 side which enables a significantly faster IP handoff. The exemplary method 200 which is described in greater detail below is based on the following assumptions:

The MN 102 has at least one HA 106 and the later is able to identify and communicate with other HAs located in other operators networks such as the D-HA 108. To avoid potential confusion between the different HAs 106 and 108, the MN's home agent is referred to herein as HA 106 and to the CN's home agent is referred to herein as D-HA 108.

The communication is secured between the HA 106 and the D-HA 108.

The HA 106 can securely communicate with any AR 110, 112, and 114 which is capable to securely exchange a Proxy Binding Update (PBU) and a Proxy Binding Acknowledgment (PBA) with the HA 106 in a Proxy MIPv6 context.

The ARs 110, 112 and 114 which can communicate securely with the HA 106 can also establish a secure communication with the D-HA 108.

The MN 102 can authenticate any of the ARs 110, 112 and 114 upon attachment to the associated link.

Figure 3:
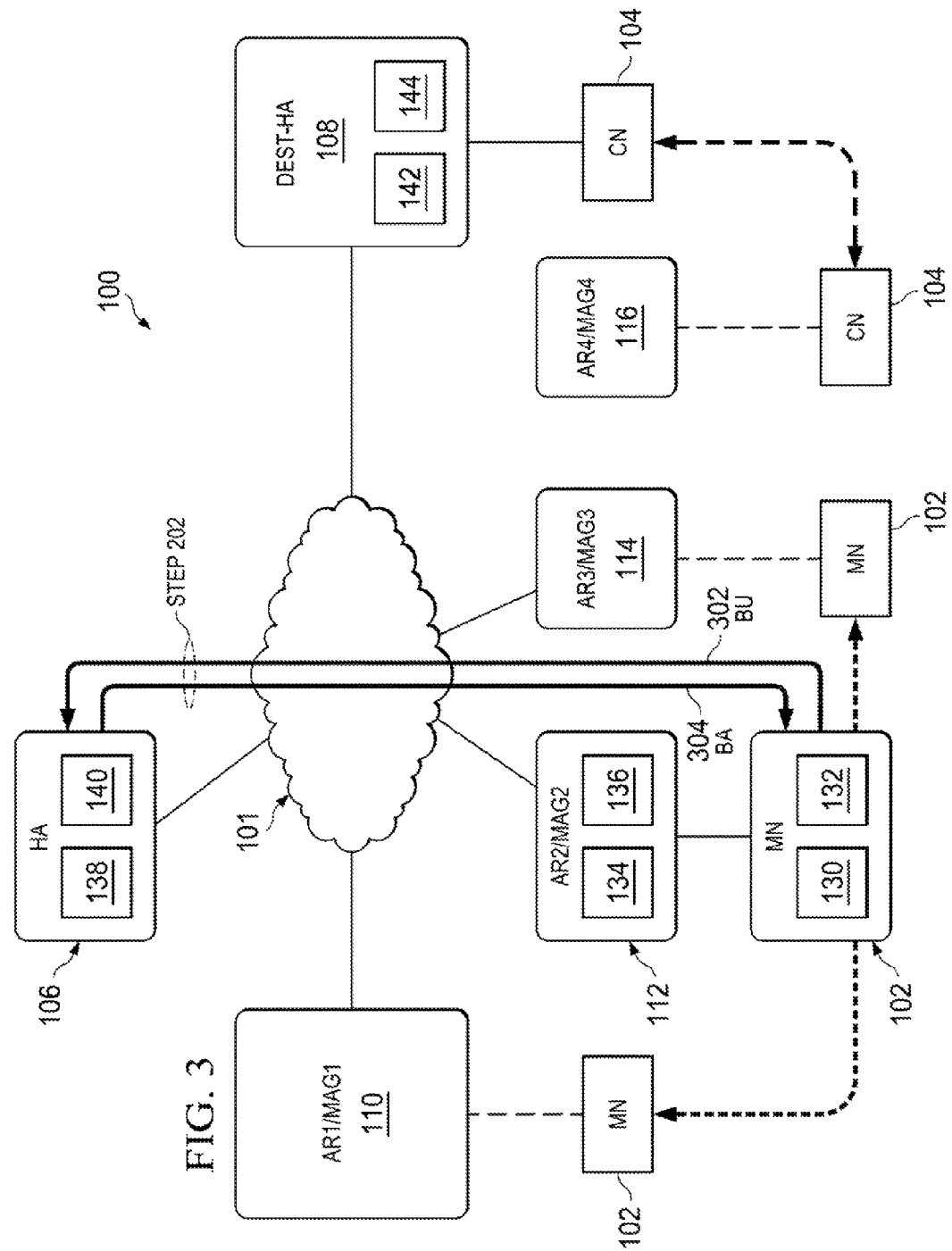
FIG. 3 is a block diagram of the exemplary network which is used to help explain in greater detail step 202 of the method 200 shown in FIG. 2 in accordance with an embodiment of the present invention.

Referring to FIG. 3, there is a block diagram of the exemplary network 100 shown to help explain in greater detail step 202 of the method 200 in accordance with an embodiment of the present invention. The first step 202 starts when the MN 102 notifies the HA about the CN's IPv6 address and its destination. Such notification occurs when the MN 102 switches to another network in order to allow the HA 106 to take actions. The decision to notify (or not) the HA 106 about the CN's IPv6 address can be based on the type of applications used by the MN 102, i.e., policy-dependent. In this discussion, assume that the MN 102 notifies it's HA 106. For instance, the notification itself can be a binding update (BU) message 302 sent by the MN 102 to the HA 106. In this scenario, the BU message would carry the CN's IPv6 address and possibly other parameters, e.g., flow(s) identifier(s), geographic destination. Upon receiving a valid BU message 302, the HA 106 takes immediate actions (detailed below) and replies to the MN 102 by sending a binding acknowledgment (BA) message 304.

Figure 4:
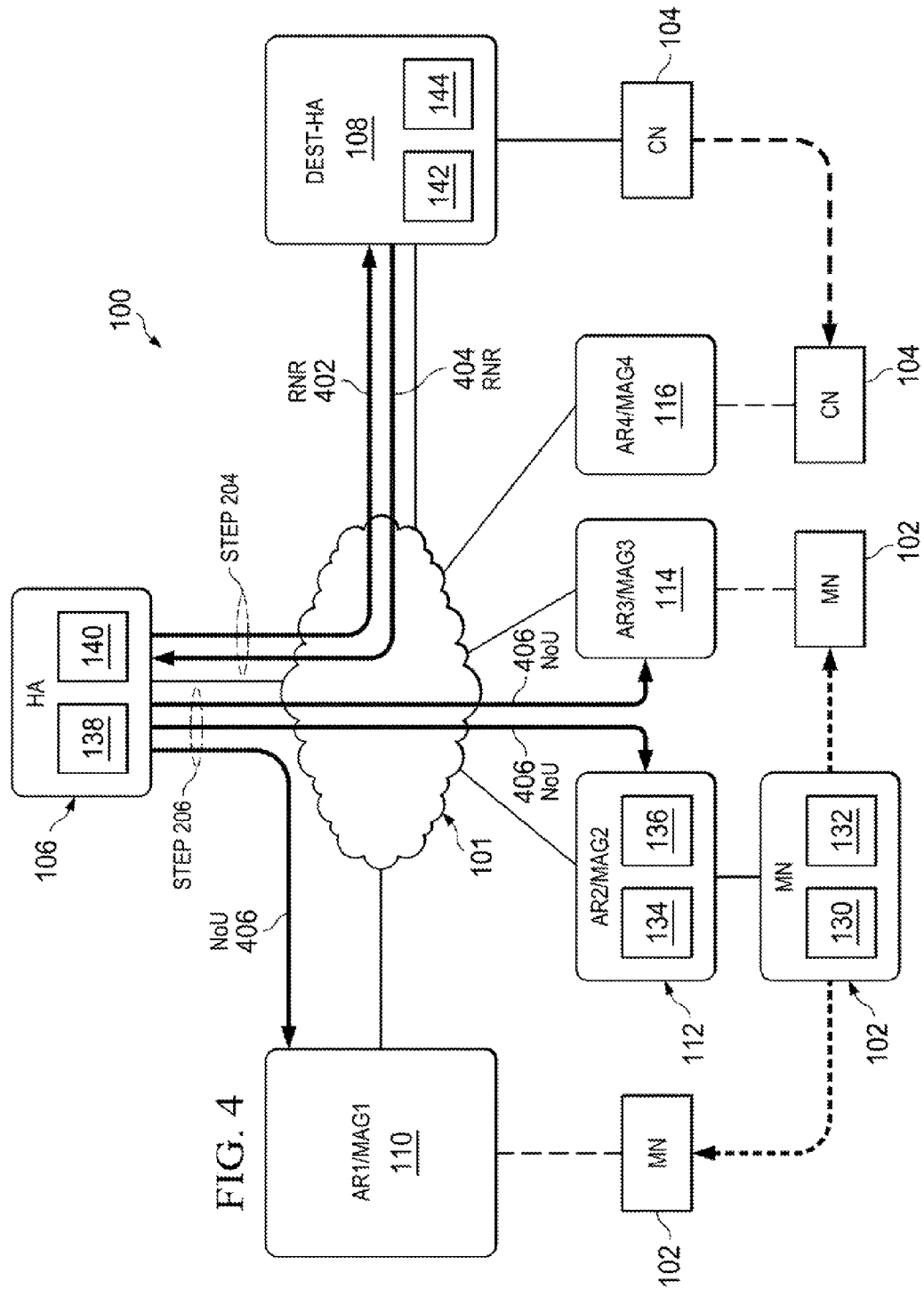
FIG. 4 is a block diagram of the exemplary network which is used to help explain in greater detail steps 204 and 206 of the method 200 shown in FIG. 2 in accordance with an embodiment of the present invention.

Referring to FIG. 4, there is a block diagram of the exemplary network 100 shown to help explain in greater detail steps 204 and 206 of the method 200 in accordance with an embodiment of the present invention. After creating a binding cache entry for the MN 102, and in parallel with sending the BA message 304 to the MN 102, the HA 106 can perform step 204 and subscribe for a presence service to monitor the CN 104 with the D-HA 108. This is done by the HA 106 sending a message called Register Notification Request (RNR) message 402 to the D-HA 108. The RNR message 402 includes the CN's IP address, the HA's "Proof-of-Interest", e.g., its certificate, the MN's HoA and a lifetime. The D-HA 108 replies by sending a message called Register Notification Acknowledgment (RNA) message 404 back to the HA 106. In this scenario, assume the HA 106 subscribes for a presence service with the D-HA 108 to monitor the CN 104.

Thereafter, the HA 106 performs step 206 and contacts potential ARs 110, 112 and 114 which may receive the MN 102 on their associated link (i.e., including the current one). As shown, the HA 106 does this by sending a message called Notification Update (NoU) message 406 to each of the ARs 110, 112 and 114 (unicast mode). Alternatively, the HA 106 can send one NoU message 406 to all of the ARs 110, 112 and 114 (multicast mode). In a simpler deployment, the HA 106 can send the NoU message 406 to only the AR 112 that is currently attached to the MN 102. In this scenario, assume the HA 106 sends the NoU message 406 to ARs 110, 112 and 114. The NoU message 406 carries the MN's home address (HoA), the MN's care-of address (CoA), the targeted CN's IP address, the D-HA's IP address, a lifetime, and a sequence number (i.e., a set of six parameters {HoA, CoA, CN, DHA, lifetime, SQN}). Each AR 110, 112 and 114 that receives the NoU message 406 creates an entry in cache memory which stores the MN's six associated parameters with the MN's HA IP address. The new RNR, RNA, NoU messages 402, 404 and 406 should be protected. If the AR 110, 112 or 114 is a MAG then the NoU message 406 may be piggybacked in a Proxy BA (PBA) message sent by the HA 106 to the MAG, i.e., upon receiving a PBU message related to the MN 102.

Figure 5:
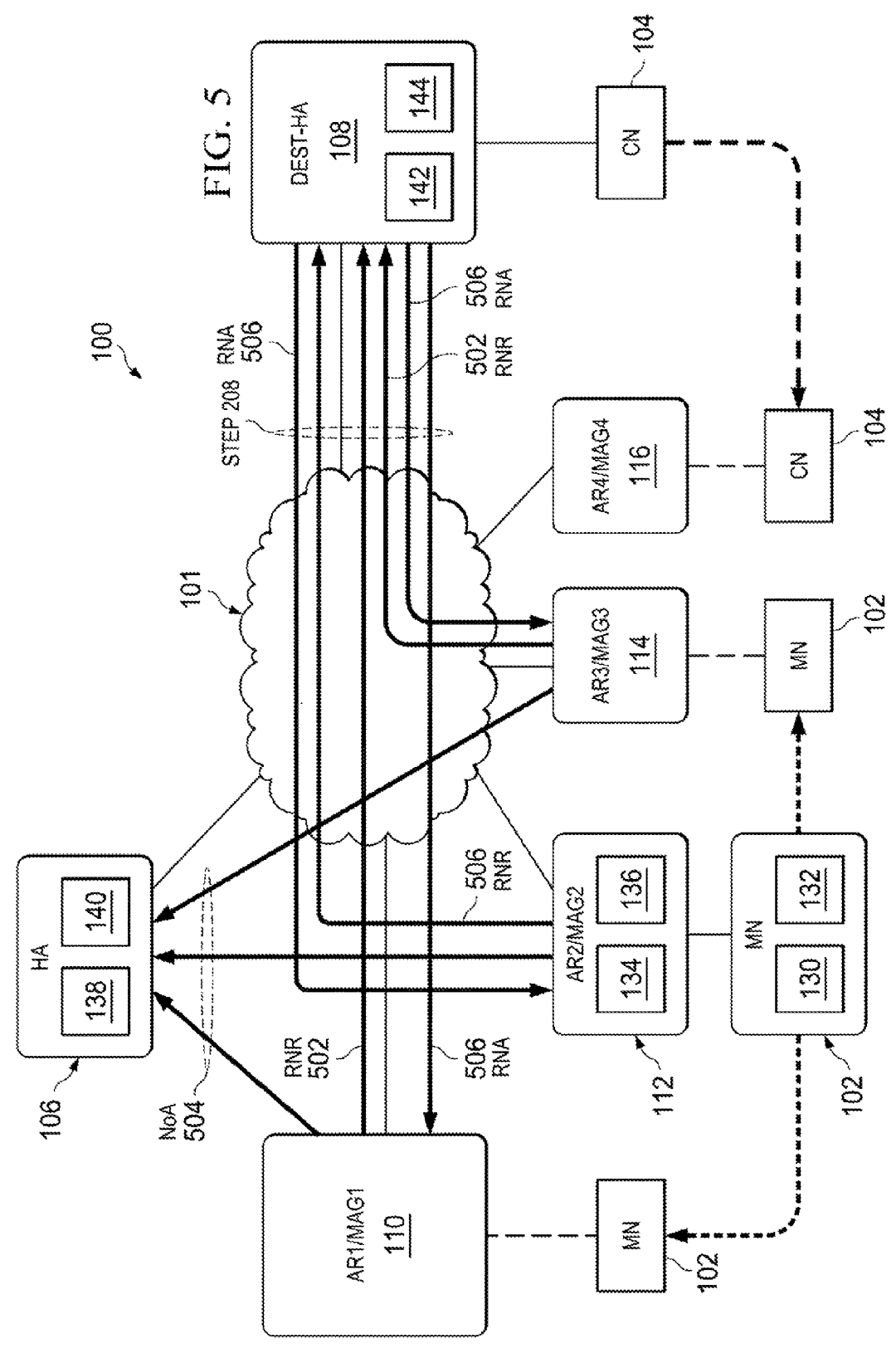

Referring to FIG. 5, there is a block diagram of the exemplary network 100 shown to help explain in greater detail step 208 of the method 200 in accordance with an embodiment of the present invention. Upon receiving the valid NoU message 406, each AR 110, 112 and 114 performs step 208 by sending a message called Register Notification Request (RNR) message 502 to the D-HA 108. The RNR messages 502 allow the ARs 110, 112, and 114 to subscribe at the D-HA 108 for a particular service (i.e., Presence Notification). In return, the D-HA 108 constantly updates each subscribed AR 110, 112 and 114 about the whereabouts of the CN 104 for the associated lifetime sent in the message 502. Each RNR message 502 carries the CN's IP address, AR certificate (optional), the MN's HoA (optional), the lifetime sent by the HA 106 in the NoU message 406 and a sequence number. Each RNR message 502 should be encrypted and integrity protected. In addition to sending the RNR messages 502, each AR 110, 112 and 114 replies to the HA 106 by sending a message called Notification Acknowledgment (NoA) message 504 in response to receiving the NoU message 406. The NoA messages 504 carry the D-HA's IP address, the lifetime, the CN's CoA, and the SQN. The NoA messages 504 should also be encrypted and integrity protected.

Upon receiving the RNR messages 502, the D-HA 108 processes the RNR messages 502 and stores the IP addresses of the ARs 110, 112 and 114 together with the requested CN's IP address, and the same lifetime and possibly the SQN sent in the NoU message 406 (i.e., and copied in the RNR messages 502). The D-HA 108 then replies to each AR 110, 112 and 114 with a new message called Registration for Notification Acknowledgment (RNA) message 506 which carries the CN's IP address and the lifetime. Starting from this moment, each time the CN 104 updates the D-HA 108 with a new CoA, the D-HA 108 will immediately notify all the ARs 110, 112 and 114 which have subscribed to a presence service associated with the CN 104. In addition the D-HA 108 would notify the MN's HA 106 which in this scenario has also subscribed to a presence service associated with the CN 104.

Figure 6:
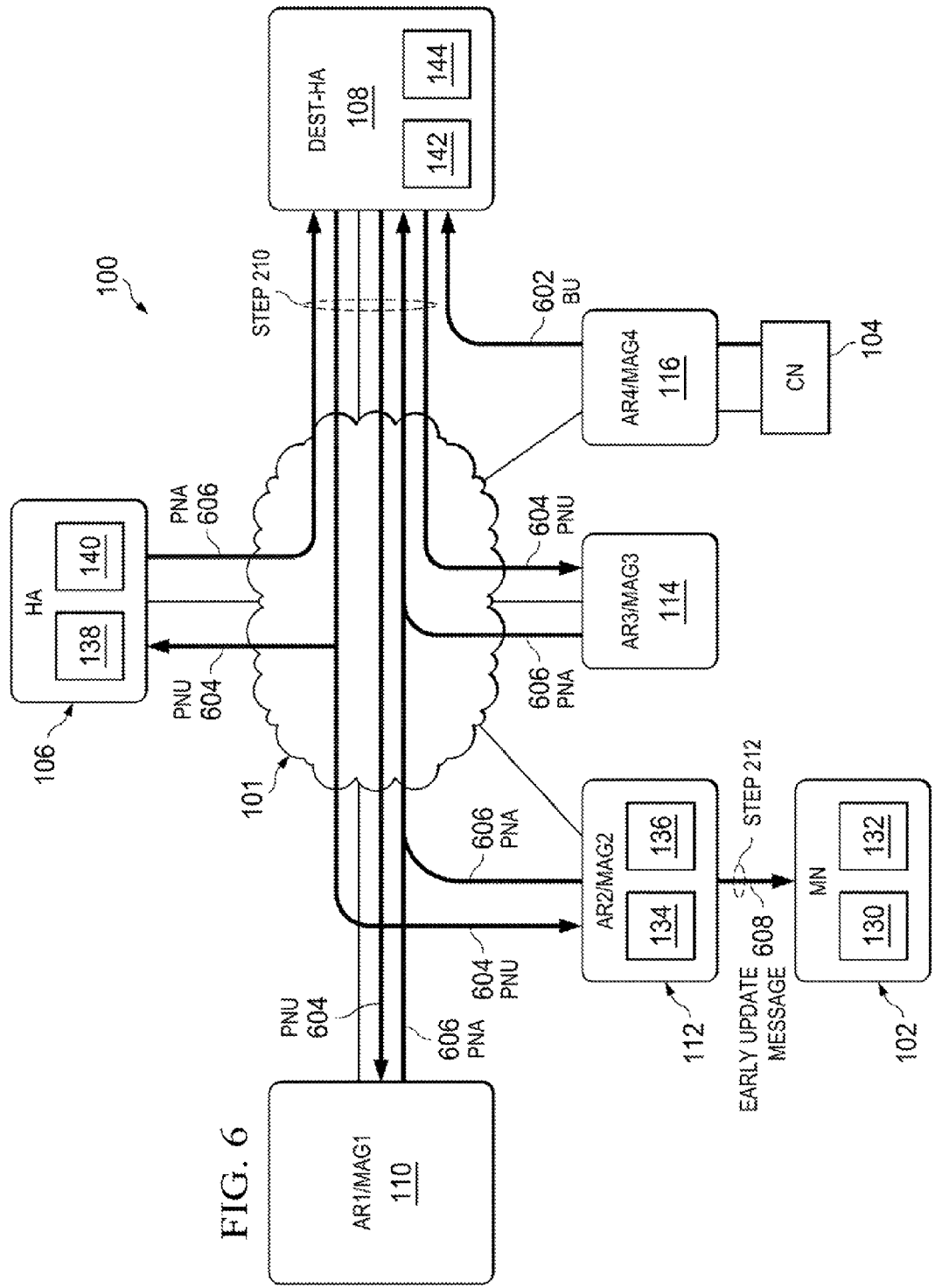
FIG. 6 is a block diagram of the exemplary network which is used to help explain in greater detail steps 210 and 212 of the method 200 shown in FIG. 2 in accordance with an embodiment of the present invention.

Referring to FIG. 6, there is a block diagram of the exemplary network 100 shown to help explain in greater detail steps 210 and 212 of the method 200 in accordance with an embodiment of the present invention. As mentioned earlier, the HA 106 and ARs 110, 112 and 114 by registering for a presence service means that the HA 106 and each AR 110, 112 and 114 is entitled to receive an immediate and secure update from the D-HA 108 regarding the whereabouts (i.e., CoA) of the CN 104. The presence service should last until the expiration of the lifetime sent in the RNR and RNA messages 402, 404, 502 and 506 exchanged between the D-HA 108 and both the HA 106 and the ARs 110, 112 and 114. Plus, each time the CN 104 refreshes its BU lifetime stored in the D-HA 108, the D-HA 108 should update the registered HA 106 and ARs 110, 112 and 114 with the new lifetime.

In this regard, upon receiving a BU message 602 from the CN 104 (recently moved to AR 116) carrying a new CoA, the D-HA 108 sends in step 210 a new message called Presence Notification Update (PNU) message 604 to the HA 106 and each AR 110, 112 and 114. The PNU message 604 carries the CN's new CoA, the same lifetime and a SQN used in the BU message 602 exchanged between the CN 104 and the D-HA 108. The PNU message 604 should be encrypted and integrity protected. The HA 106 and ARs 110, 112 and 114 should acknowledge receipt of a valid PNU message 604 by sending a message called Presence Notification Acknowledge (PNA) message 606 to the D-HA 108, which carries the CN's new CoA and the SQN sent in the PNU message 604. The PNA message 606 should be encrypted and integrity protected.

The receipt of a valid PNU message 604 is immediately followed by the sending of an early update message 608 (containing the CN's CoA) per step 212 from the AR 112 (for example) which is hosting the MN 102. The MN 102 upon receiving the early update message 608 can quickly re-direct data traffic to the new direct path to the CN 104. In this way, the re-direction of the data traffic does not require any mobility signaling messages exchange between the two endpoints namely the MN 102 and CN 104. Upon the MN 102 returning to its home, the HA 106 should de-register all ARs 110, 112 and 114 which have subscribed earlier to the D-HA 108. For instance, the HA 106 can do this by requesting the D-HA 108 to stop refreshing the lifetime sent to each AR 110, 112 and 114 that has registered for the presence service for the particular MN 102. Consequently, whenever the lifetime associated with a presence service expires the AR 110, 112 and 114 flushes the corresponding data stored within its cache.

In an alternative embodiment, the MN's HA 106 can be the first (and only) entity which subscribes to a presence service for any mobile CN 104 which is exchanging data packets with the MN 102. In this case, the MN's HA 106 will be responsible for updating the MN 102 with the new CoA of the CN 104 by sending the MN 102 a direct message which enables the two endpoints to keep using the RO mode (or to fallback to the BT mode if needed). However, such an exchange may increase the overall latency and would not be as efficient as the hosting AR 112 sending the early update message 608 to the MN 102. On the other hand, if the HA 106 does send the direct message to the MN 102 then the ARs 110, 112 and 114 would not have to register for the presence notification service with the D-HA 108.

From the foregoing, one skilled in the art will appreciate that the present invention is aimed, at least, to provide a 'Hybrid' Route Optimization mode, which enables two mobile endpoints (i.e., MN 102 and CN 104) to re-direct their data traffic to the optimal path without exchanging any mobility signaling messages. To accomplish this, the present invention introduces a new service between the HA 106, D-HA 108 and the ARs 110, 112 and 114 called "presence" service. The "presence" service is an explicit request/reply exchange between the D-HA 108 and the HA 106 and/or ARs 110, 112 and/or 114 which are interested in tracking the movement of a specific target (i.e., CN 104). Such requests carry a "Proof-of-Interest (PoI)" and should be protected. In its simplest form, a "Proof-of-Interest" can be the sender's certificate, which mentions its role as for instance a HA 106 for a specific MN 102 advertise the same prefix used by the MN 102). When accepting a request for subscription to a "presence" service, the receiving D-HA 108 replies to the sender (e.g., HA 106, ARs 110, 112 and/or 114) by sending them an ACK message. The sender's IP address is then stored in the cache memory of the receiving D-HA 108 together with the requested target's IP address and a lifetime (other parameters can also be stored). As can be seen, multiple entities HA 106 and/or ARs 110, 112 and/or 114 may subscribe for a presence service that is related to the same target CN 104. Until the lifetime expiration, each time the specified target CN 104 updates its own D-HA 108 with a new CoA, the target's D-HA 108 in turn immediately update all of the entities (i.e., HA 106 and/or ARs 110, 112 and/or 114) which are subscribed to a "presence" service involving the specific target CN 104. When a presence service lifetime expires, the target's D-HA 108 removes the associated entry from its cache memory unless a renewal message is received.

The present invention also provides a MN 102 for enabling a hybrid route optimization with another mobile CN 104, wherein the MN 102 is associated with a HA 102 and the CN 104 is associated with a D-HA 108, and wherein the MN 102 is able to move around and attach to anyone of a plurality of ARs 110, 112 and 114. The MN 102 includes: (a) a processor 130; and (b) a memory 132 that stores processor-executable instructions where the processor 130 interfaces with the memory 132 and executes the processor-executable instructions to: (i) send a first message 302 to the HA 106, wherein the first message 302 includes an IP address of the CN 104, wherein the HA 106 uses the IP address to identify the D-HA 108, wherein the HA 106 sends a second message 406 to at least one of the ARs 110, 112 and 114, wherein the second message 406 includes information about the MN 102, the CN 104, and the D-HA 108, wherein the at least one of the ARs 110, 112 and 114 sends a third message 502 to the D-HA 108, wherein the third message 502 subscribes the at least one of the ARs 110, 112 and 114 at the D-HA 108 for a presence notification service in which the D-HA 108 is to update the at least one of the ARs 110, 112 and 114 about a care-of address of the CN 104 whenever the CN 104 sends the care-of address to the D-HA 108, wherein the D-HA 108 sends a fourth message 606 to the at least one of the ARs 110, 112 and 114, wherein the fourth message 606 identifies the care-of address of the CN 104, and (ii) receive a fifth message 608 from one of the at least one ARs 110, 112 and 114 that is attached to the MN 102, wherein the fifth message 608 includes the care-of address of the CN which enables a re-direction of data traffic between the MN 102 and the CN 104. The MN 102 can also implement a method which includes the two aforementioned steps (i) and (ii).

The present invention also provides an AR 112 (for example) for enabling a hybrid route optimization between two mobile endpoints including a MN 102 and a CN 104, wherein the MN 102 is attached to the AR 112 and associated with a HA 106 and the CN 106 is associated with a D-HA 108, wherein the MN 102 sends a first message 302 to the HA 106, wherein the first message 302 includes an IP address of the CN 104, and wherein the HA 106 uses the IP address to identify the D-HA 108. The AR 112 comprises: (a) a processor 134; and (b) a memory 136 that stores processor-executable instructions wherein the processor 134 interfaces with the memory 136 and executes the processor-executable instructions to: (i) receive a second message 406 from the HA 106, wherein the second message 406 includes information about the MN 102, the CN 104, and the D-HA 108; (ii) send a third message 502 to the D-HA 108, wherein the third message 502 subscribes the AR 112 at the D-HA 108 for a presence notification service in which the D-HA 108 is to update the AR 112 about a care-of address of the CN 104 whenever the CN 104 sends the care-of address to the D-HA 108; (iii) receive a fourth message 606 from the D-HA 108, wherein the fourth message 606 identifies the care-of address of the CN 104; and (iv) send a fifth message 608 to the MN 102, wherein the fifth message 608 includes the care-of address of the CN 104 which enables a re-direction of data traffic between the MN 102 and the CN 104. The AR 112 can also implement a method which includes the four aforementioned steps (i), (ii), (iii) and (iv).

The present invention also provides an HA 106 for enabling a hybrid route optimization between two mobile endpoints including a MN 102 and a CN 104, wherein the MN 102 is associated with the HA 106 and the CN 104 is associated with a D-HA 108, wherein the MN 102 is able to move around and attach to anyone of a plurality of ARs 110, 112 and 114. The HA 106 includes: (a) a processor 138; and (b) a memory 140 that stores processor-executable instructions wherein the processor 138 interfaces with the memory 140 and executes the processor-executable instructions to: (i) receive a first message 302 from the MN 102, wherein the first message 302 includes an IP address of the CN 104; (ii) use the IP address to identify the D-HA 108; (iii) send a second message 406 to at least one of the ARs 110, 112 and 114, wherein the second message 406 includes information about the MN 102, the CN 104, and the D-HA 108, wherein the at least one of the ARs 110, 112 and 114 sends a third message 502 to the D-HA 108, wherein the third message 502 subscribes the at least one of the ARs 110, 112 and 114 at the D-HA 108 for a presence notification service in which the D-HA 108 is to update the at least one of the ARs 110, 112 and 114 about a care-of address of the CN 104 whenever the CN 104 sends the care-of address to the D-HA 108, wherein the D-HA 108 sends a fourth message 606 to the at least one of the ARs 110, 112 and 114, wherein the fourth message 606 identifies the care-of address of the CN 104, and wherein one of the at least one of the ARs 110, 112 and 114 that receives the fourth message 606 and is attached to the MN 102 sends a fifth message 608 to the MN 102, and wherein the fifth message 608 includes the care-of address of the CN 104 which enables a re-direction of data traffic between the MN 102 and the CN 104. The HA 106 can also implement a method which includes the three aforementioned steps (i), (ii) and (iii).

The present invention also provides a D-HA 108 for enabling a hybrid route optimization between two mobile endpoints including a MN 102 and a CN 104, wherein the MN 102 is associated with a HA 106 and the CN 104 is associated with the D-HA 108, wherein the MN 102 is able to move around and attach to anyone of a plurality of ARs 110, 112 and 114, wherein the MN 102 sends a first message 302 to the HA 106, wherein the first message 302 includes an IP address of the CN 104, wherein the HA 106 uses the IP address to identify the D-HA 108, wherein the HA 106 sends a second message 406 to at least one of the ARs 110, 112 and 114, wherein the second message 406 includes information about the MN 102, the CN 104, and the D-HA 108. The D-HA 108 includes: (a) a processor 142; and (b) a memory 144 that stores processor-executable instructions wherein the processor 142 interfaces with the memory 144 and executes the processor-executable instructions to: (i) receive a third message 502 from the at least one of the ARs 110, 112 and 114, wherein the third message 502 subscribes the at least one of the ARs 110, 112 and 114 at the D-HA 108 for a presence notification service in which the D-HA 108 is to update the at least one of the ARs 110, 112 and 114 about a care-of address of the CN 104 whenever the CN 104 sends the care-of address to the D-HA 108; (ii) send a fourth message 606 to the at least one of the ARs 110, 112 and 114, wherein the fourth message 606 identifies the care-of address of the CN 104, wherein one of the at least one of the ARs 110, 112 and 114 that receives the fourth message 606 and is attached to the MN 102 sends a fifth message 608 to the MN 102, and wherein the fifth message 508 includes the care-of address of the CN 104 which enables a re-direction of data traffic between the MN 102 and the CN 104. The D-HA 108 can also implement a method which includes the two aforementioned steps (i) and (ii).

The present invention also provides a HA 106 for enabling a hybrid route optimization between two mobile endpoints including a MN 102 and a CN 104, wherein the MN 102 is associated with the HA 106 and the CN 104 is associated with a D-HA 108, and wherein the MN 102 is able to move around and attach to anyone of a plurality of ARs 110, 112, and 114. The HA 106 includes: (a) a processor 138; and (b) a memory 140 that stores processor-executable instructions wherein the processor 138 interfaces with the memory 140 and executes the processor-executable instructions to: (i) receive a first message from the MN 102, wherein the first message includes an Internet Protocol address of the CN 104; (ii) use the Internet Protocol address to identify the D-HA 108; (iii) send a second message to the D-HA 108, wherein the second message subscribes the HA 106 at the D-HA 108 for a presence notification service in which the D-HA 108 is to update the HA 106 about a care-of address of the CN 104 whenever the CN 104 sends the care-of to address to the D-HA 108; (iv) receive a third message from the D-HA 108, wherein the third message identifies the care-of address of the CN 104; and (v) send a fourth message to the MN 102, wherein the fourth message includes the care-of address of the CN 104 which enables a re-direction of data traffic between the MN 102 and the CN 104. The HA 106 can also implement a method which includes the five aforementioned steps (i), (ii), (iii), (iv) and (v).

Those skilled in the art will appreciate that the proposed method 200 not only significantly enhances the IP mobility handoff but can be further optimized when applied in a "predefined" mobility context. In fact, the proposed method 200 has multiple advantages including (for example): (1) no mobility signaling between two or more mobile nodes exchanging data there between; (2) very low IP handoff latency (i.e., fast handoff); (3) highly secure; and (4) enable route optimization (RO), i.e., exchange data packets on the direct path.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the present invention that as has been set forth and defined within the following claims.

The invention claimed is:

1. A method for enabling a hybrid route optimization in a network between two mobile endpoints including a mobile node and a correspondent node, wherein the mobile node is associated with a home agent and the correspondent node is associated with a destination home agent, wherein the mobile node is able to move around and attach to anyone of a plurality of access routers, the method comprising the steps of:

sending a first message from the mobile node to the home agent, wherein the first message includes an Internet Protocol address of the correspondent node, wherein the home agent uses the Internet Protocol address to identify the destination home agent;

sending a second message from the home agent to at least one of the access routers, wherein the second message includes information about the mobile node, the correspondent node, and the destination home agent;

sending a third message from the at least one of the access routers to the destination home agent, wherein the third message subscribes the at least one of the access routers at the destination home agent for a presence notification service in which the destination home agent is to update the at least one of the access routers about a care-of address of the correspondent node whenever the correspondent node sends the care-of address to the destination home agent;

sending a fourth message from the destination home agent to the at least one of the access routers, wherein the fourth message identifies the care-of address of the correspondent node; and upon receiving the fourth message, one of the at least one of the access routers attached to the mobile node sends a fifth message to the mobile node, wherein the fifth message includes the care-of address of the correspondent node which enables a re-direction of data traffic between the mobile node and the correspondent node.

2. The method of claim 1, wherein the first message is a binding update message.

3. The method of claim 1, wherein the second message is a notification update message that includes:

a home address of the mobile node;

a care-of address of the mobile node;

the Internet Protocol address of the correspondent node;
an Internet Protocol address of the D-HA;
a lifetime parameter; and
a sequence number.

4. The method of claim 1, wherein the third message is a register notification request message that includes:
the Internet Protocol address of the correspondent node;
a lifetime parameter; and
a sequence number.

5. The method of claim 1, wherein the fourth message is a presence notification update message that includes:
the care-of address of the correspondent node;
a lifetime parameter; and
a sequence number.

6. The method of claim 1, wherein the fifth message is an early update message.

7. A network for enabling a hybrid route optimization between two mobile endpoints including a mobile node and a correspondent node, wherein the mobile node is associated with a home agent and the correspondent node is associated with a destination home agent, wherein the mobile node is able to move around and attach to anyone of a plurality of access routers, the network comprises:
the mobile node sends a first message to the home agent, wherein the first message includes an Internet Protocol address of the correspondent node, wherein the home agent uses the Internet Protocol address to identify the destination home agent;
the home agent sends a second message to at least one of the access routers, wherein the second message includes information about the mobile node, the correspondent node, and the destination home agent;
the at least one of the access routers sends a third message to the destination home agent, wherein the third message subscribes the at least one of the access routers at the destination home agent for a presence notification service in which the destination home agent is to update the at least one of the access routers about a care-of address of the correspondent node whenever the correspondent node sends the care-of address to the destination home agent;
the destination home agent sends a fourth message to the at least one of the access routers, wherein the fourth message identifies the care-of address of the correspondent node; and
one of the at least one of the access routers that receives the fourth message and is attached to the mobile node sends a fifth message to the mobile node, wherein the fifth message includes the care-of address of the correspondent node which enables a re-direction of data traffic between the mobile node and the correspondent node.

8. The network of claim 7, wherein the first message is a binding update message.

9. The network of claim 7, wherein the second message is a notification update message that includes:
a home address of the mobile node;
a care-of address of the mobile node;
the Internet Protocol address of the correspondent node;
an Internet Protocol address of the D-HA;
a lifetime parameter; and
a sequence number.

10. The network of claim 7, wherein the third message is a register notification request message that includes:
the Internet Protocol address of the correspondent node;
a lifetime parameter; and
a sequence number.

11. The network of claim 7, wherein the fourth message is a presence notification update message that includes:
the care-of address of the correspondent node;
a lifetime parameter; and
a sequence number.

12. The network of claim 7, wherein the fifth message is an early update message.

13. An access router for enabling a hybrid route optimization between two mobile endpoints including a mobile node and a correspondent node, wherein the mobile node is attached to the access router and associated with a home agent and the correspondent node is associated with a destination home agent, wherein the mobile node sends a first message to the home agent, wherein the first message includes an Internet Protocol address of the correspondent node, wherein the home agent uses the Internet Protocol address to identify the destination home agent, the access router comprises:
a processor; and
a memory that stores processor-executable instructions wherein the processor interfaces with the memory and executes the processor-executable instructions to:
receive a second message from the home agent, wherein the second message includes information about the mobile node, the correspondent node, and the destination home agent;
send a third message to the destination home agent, wherein the third message subscribes the access router at the destination home agent for a presence notification service in which, the destination home agent is to update the access router about a care-of address of the correspondent node whenever the correspondent node sends the care-of address to the destination home agent with the care-of address;
receive a fourth message from the destination home agent, wherein the fourth message identifies the care-of address of the correspondent node; and
send a fifth message to the mobile node, wherein the fifth message includes the care-of address of the correspondent node which enables a re-direction of data traffic between the mobile node and the correspondent node.

14. A home agent for enabling a hybrid route optimization between two mobile endpoints including a mobile node and a correspondent node, wherein the mobile node is associated with the home agent and the correspondent node is associated with a destination home agent, wherein the mobile node is able to move around and attach to anyone of a plurality of access routers, the home agent comprises:
a processor; and
a memory that stores processor-executable instructions wherein the processor interfaces with the memory and executes the processor-executable instructions to:
receive a first message from the mobile node, wherein the first message includes an Internet Protocol address of the correspondent node;
use the Internet Protocol address to identify the destination home agent;
send a second message to at least one of the access routers, wherein the second message includes information about the mobile node, the correspondent node, and the destination home agent;
wherein the at least one of the access routers sends a third message to the destination home agent, wherein the third message subscribes the at least one of the access routers at the destination home agent for a presence notification service in which the destination home agent is to update the at least one of the access routers about a care-of address of the correspondent node whenever the correspondent node sends the care-of address to the destination home agent;

wherein the destination home agent sends a fourth message to the at least one of the access routers, wherein the fourth message identifies the care-of address of the correspondent node; and wherein one of the at least one of the access routers that receives the fourth message and is attached to the mobile node sends a fifth message to the mobile node, wherein the fifth message includes the care-of address of the correspondent node which enables a re-direction of data traffic between the mobile node and the correspondent node.

15. A destination home agent for enabling a hybrid route optimization between two mobile endpoints including a mobile node and a correspondent node, wherein the mobile node is associated with a home agent and the correspondent node is associated with the destination home agent, wherein the mobile node is able to move around and attach to anyone of a plurality of access routers, wherein the mobile node sends a first message to the home agent, wherein the first message includes an Internet Protocol address of the correspondent node, wherein the home agent uses the Internet Protocol address to identify the destination home agent, wherein the home agent sends a second message to at least one of the access routers, wherein the second message includes information about the mobile node, the correspondent node, and the destination home agent, the destination home agent comprises:

a processor; and
   a memory that stores processor-executable instructions wherein the processor interfaces with the memory and executes the processor-executable instructions to:
      receive a third message from the at least one of the access routers, wherein the third message subscribes the at least one of the access routers at the destination home agent for a presence notification service in which the destination home agent is to update the at least one of the access routers about a care-of address of the correspondent node whenever the correspondent node sends the care-of address to the destination home agent;
      send a fourth message to the at least one of the access routers, wherein the fourth message identifies the care-of address of the correspondent node; and
      wherein one of the at least one of the access routers that receives the fourth message and is attached to the mobile node sends a fifth message to the mobile node, wherein the fifth message includes the care-of address of the correspondent node which enables a re-direction of data traffic between the mobile node and the correspondent node.

16. A home agent for enabling a hybrid route optimization between two mobile endpoints including a mobile node and a correspondent node, wherein the mobile node is associated with the home agent and the correspondent node is associated with a destination home agent, wherein the mobile node is able to move around and attach to anyone of a plurality of access routers, the home agent comprises:

a processor; and
   a memory that stores processor-executable instructions wherein the processor interfaces with the memory and executes the processor-executable instructions to:
      receive a first message from the mobile node, wherein the first message includes an Internet Protocol address of the correspondent node;
      use the Internet Protocol address to identify the destination home agent;
      send a second message to the destination home agent, wherein the second message subscribes the home agent at the destination home agent for a presence notification service in which the destination home agent is to update the home agent about a care-of address of the correspondent node whenever the correspondent node sends the care-of address to the destination home agent;
      receive a third message from the destination home agent, wherein the third message identifies the care-of address of the correspondent node; and
      send a fourth message to the mobile node, wherein the fourth message includes the care-of address of the correspondent node which enables a re-direction of data traffic between the mobile node and the correspondent node.

* * * * *

UNITED STATES PATENT AND TRADEMARK OFFICE
CERTIFICATE OF CORRECTION

PATENT NO. : 8,385,285 B2
APPLICATION NO. : 12/828811
DATED : February 26, 2013
INVENTOR(S) : Haddad It is certified that error appears in the above-identified patent and that said Letters Patent is hereby corrected as shown below:

In the Specifications:

In Column 2, Line 6, delete "LIE." and insert -- LTE. --, therefor.

In Column 3, Line 25, delete "HA;" and insert -- HA, --, therefor.

In Column 6, Line 12, delete "(i.e.;" and insert -- (i.e., --, therefor.

In Column 9, Line 37, delete "102 advertise" and insert -- 102 (i.e., advertise --, therefor.

In Column 11, Line 66, delete "care-of to address" and insert -- care-of address --, therefor.

In Column 14, Line 29, in Claim 13, delete "which, the" and insert -- which the --, therefor.

Signed and Sealed this
Eighteenth Day of June, 2013

Teresa Stanek Rea
*Acting Director of the United States Patent and Trademark Office*